US012692182B2

(12) United States Patent
Safaei Takhtehfouladi et al.

(10) Patent No.: US 12,692,182 B2
(45) Date of Patent: Jul. 28, 2026

(54) PROCESSES FOR TREATMENT OF RESIDUALS

(71) Applicants: VALORBEC S.E.C., Montréal (CA); UNIVERSITY OF MANITOBA, Winnipeg (CA); TULANE UNIVERSITY, New Orleans, LA (US); ATOMES FD INC., Saint-Laurent (CA)

(72) Inventors: Elham Safaei Takhtehfouladi, Montréal (CA); Maria Elektorowicz, Lachine (CA); Robert S. Reimers, PKWY Metairie, LA (US); Jan Oleszkiewicz, Winnipeg (CA); Fadi Dagher, Sainte-Dorothée (CA)

(73) Assignee: UNIVERSITÉ CONCORDIA, Montréal (CA)

( * ) Notice: Subject to any disclaimer, the term of this patent is extended or adjusted under 35 U.S.C. 154(b) by 504 days.

(21) Appl. No.: 17/744,894

(22) Filed: May 16, 2022

(65) Prior Publication Data

US 2023/0002266 A1 Jan. 5, 2023

Related U.S. Application Data

(63) Continuation of application No. 16/277,701, filed on Feb. 15, 2019, now abandoned, which is a
(Continued)

(51) Int. Cl.
C02F 11/00 (2006.01)
B09C 1/08 (2006.01)
(Continued)

(52) U.S. Cl.
CPC .............. *C02F 11/006* (2013.01); *B09C 1/08* (2013.01); *B09C 1/085* (2013.01); *C02F 1/4672* (2013.01);
(Continued)

(58) Field of Classification Search
CPC .................................. C02F 1/46; C02F 11/15
See application file for complete search history.

(56) References Cited

U.S. PATENT DOCUMENTS 4,755,305 A 7/1988 Fremont et al.
5,048,404 A 9/1991 Bushnell et al.
(Continued)

FOREIGN PATENT DOCUMENTS

CA 2511091 A1 12/2005
CA 2569025 A1 * 6/2008 ............. A01N 37/20
(Continued)

OTHER PUBLICATIONS

Machine translation of CA 2511091 A1 to Drogui (Year: 2005).*
(Continued)

*Primary Examiner* — Harry D Wilkins, III
(74) *Attorney, Agent, or Firm* — Wood, Phillips, Katz, Clark, & Mortimer

(57) ABSTRACT

There are provided processes for treating a residual. For example, such processes can comprise treating a mixture comprising the residual, a peracid or source thereof and an ammonium salt in a reactor, with an electric field, by means of at least one anode and at least one cathode that define therebetween an electrokinetic zone for treating the mixture. Such processes allow for inactivation of at least one type of pathogen in the residual so as to obtain a treated residual.

16 Claims, 6 Drawing Sheets

Related U.S. Application Data continuation of application No. 14/438,123, filed as application No. PCT/CA2013/000924 on Oct. 25, 2013, now abandoned.

(60) Provisional application No. 61/718,386, filed on Oct. 25, 2012.

(51) Int. Cl.
| | |
|---|---|
| *C02F 1/461* | (2023.01) |
| *C02F 1/467* | (2023.01) |
| *C02F 1/72* | (2023.01) |
| *C02F 11/15* | (2019.01) |

(52) U.S. Cl.
CPC .... *C02F 11/15* (2019.01); *C02F 2001/46138* (2013.01); *C02F 2001/46161* (2013.01); *C02F 2001/46171* (2013.01); *C02F 1/722* (2013.01); *C02F 2201/46135* (2013.01); *C02F 2201/46155* (2013.01); *C02F 2201/4617* (2013.01); *C02F 2201/4618* (2013.01); *C02F 2303/04* (2013.01); *C02F 2303/06* (2013.01); *C02F 2305/023* (2013.01)

(56) References Cited

U.S. PATENT DOCUMENTS

| | | | | |
|---|---|---|---|---|
| 5,695,650 | A | 12/1997 | Held | |
| 6,274,028 | B1 | 8/2001 | Hu et al. | |
| 6,491,820 | B2 | 12/2002 | Held et al. | |
| 6,645,366 | B2 | 11/2003 | Iseki et al. | |
| 7,648,631 | B2 | 1/2010 | Choi et al. | |
| 2004/0007476 | A1* | 1/2004 | Tennakoon | C25B 1/28 |
| | | | | 205/465 |
| 2009/0321251 | A1 | 12/2009 | Rigby | |
| 2010/0051542 | A1 | 3/2010 | Elektorowicz et al. | |
| 2010/0078389 | A1* | 4/2010 | Elektorowicz | C02F 11/15 |
| | | | | 210/668 |
| 2012/0132521 | A1 | 5/2012 | Silver et al. | |

FOREIGN PATENT DOCUMENTS

| | | |
|---|---|---|
| WO | 2010147683 | 12/2010 |
| WO | 2012167375 | 12/2012 |

OTHER PUBLICATIONS

Niemann, (Abstract), Radiation and Environmental Biophysics, vol. 20, Issue 1, pp. 53-65, 1981.

Sale et al., (Abstract), Biochimica et Biophysica Acta (BBA)—General Subjects, vol. 148, Issue 3, pp. 781-788, Dec. 27, 1967.

Ibeid, "Education and Training Credits at WEFTEC", Oct. 2011.

Tiehm et al., "Bio-electro-remediation: electrokinetic transport of nitrate in a flow-through system for enhanced toluene biodegradation", J Appl Electrochem (2010) 40:1263-1268.

Hasan et al., "Pilot Submerged Membrane Electro-Bioreactor (SMEBR) for COD, Nutrients and Heavy Removal", 2012.

Wang et al., "Aerobic Denitrification of Nitrate Wastewater and dynamic analysis of the Microbial Community in a Bio-ceramic Reactor", 978-1-4244-2902-8/09/$25.00 (2009) IEEE.

Qu et al., "Dentrification of drinking water by a combined process of heterotrophication and electrochemical autotrophication", J. Envioron. Sci. Health, A37(4), 651-665 (2002).

Vasudevan et al., "Remediation of Phosphate-Contaminated Water by Electrocoagulation with Aluminium, Aluminium Alloy and Mild Steel Anodes", http://www.sciencedirect.com/science/article/pii/S0304389408014064, May 30, 2009.

English Abstract of JP11262797, "Sewage Treatment Apparatus", published on Sep. 28, 1999.

English Abstract of JP2005138091, "Method for Removing Nitrogen and Phosphorus in Waste Water", published on Jun. 2, 2005.

Irdemez et al., "Optimization of Phosphate Removal from Wastewater by Electrocoagulation with Aluminum Plate Electrodes", http://www.sciencedirect.com/science/article/pii/S1383586606001857, Mar. 9, 2006.

Elektorowicz et al., "Pilot Submerged Membrane Electro-Bioreactor (SMEBR) for COD, Nutrients and Heavy Metals Removal", Water Supply and Quality, Stare Jablonki, Poland, Sep. 9-12, 2012.

Ibeid et al., "Complete Removal of Total Nitrogen (N) and Phosphorus (P) in a Single Membrane Electro-Bioreactor", WEDTEC 2011.

Ahn et al., "Enhanced biological phosphorus and nitrogen removal using a sequencing anoxic/anaerobic membrane bioreactor (SAM) process", Desalination 157 (2003) 345-352.

Cho et al., "Sequencing anoxic/anaerobic membrane bioreactor (SAM) pilot plant for advanced wastewater treatment", Desalination 178 (2005) 219-225.

Choi et al., "Oxidation Reduction Potential atomatic control potential of intermittently aerated membrane bioreactor for nitrification and denitrification", Water Science & Technology—WST, 60.1, 2009, 167-173.

Fu et al., "Simultaneous nitrification and denitrification coupled with phosphorus removal in an modified anoxic/oxic-membrane bioreactor (A/O-MBR)", Biochemical Engineering Journal 43 (2009) 191-196.

Jianlong et al., "Nitrogen Removal by Simultaneous Nitrification and Denitrification via Nitrite in a Sequence Hybrid Biological Reactor", Chinese Journal of Chemical Engineering, 16(5) 778-784 (2008).

Kim et al., "Effect of an electro phosphorous removal process on phosphorous removal and membrane permeability in a pilot-scale MBR", Desalination 250 (2010) 629-633.

Rezania et al., "Hydrogen-driven denitrification of wastewater in an anaerobic submerged membrane bioreactor: potential for water reuse", Water Science & Technology vol. 54 No. 11-12 pp. 207-214 (2006).

Rezania et al., "Hydrogen-dependent denitrification of water in an anaerobic submerged membrane bioreactor coupled with a novel hydrogen delivery system", Water Research 41 (2007) 1074-1080.

Sunger et al., "Autotrophic denitrification using hydrogen generated from metallic iron corrosion", Bioresource Technology 100 (2009) 4077-4082.

Trigo et al., "Start-up of the Anammox process in a membrane bioreactor", Journal of Biotechnology 126 (2006) 475-487.

Tsushima et al., "Development of high-rate anaerobic ammonium-oxidizing (anammox) biofilm reactors", Water Research 41 (2007) 1623-1634.

Udert et al., "Effect of heterotrophic growth on nitritation/anammox in a single sequencing batch reactor", Water Science & Technology—WST, 58.2 (2008) 277-284.

Wu et al., "Nitrification-denitrification via nitrite in SBR using real-time control strategy when treating domestic wastewater", Biochemical Engineering Journal 36 (2007) 87-92.

Yang et al., "High-rate nitrogen removal by the Anammox process with a sufficient inorganic carbon source", Bioresource Technology 101 (2010) 9471-9478.

Yoo et al., "Nitrogen Removal from synthetic wastewater by simultaneous nitrification and denitrification (SND) via nitrite in an intermittently-aerated reactor", Wat. Res. vol. 33, No. 1, pp. 145-154, 1999.

Gharibi et al., "Phosphorous removal from wastewater effluent using electro-coagulation by aluminum and iron plates", Anal. Bioanal. Electrochem., vol. 2, No. 3, 2010, 165-177.

Chapter 6, "Water Treatment Processes for Reducing Nitrate Concentrations", (1997).

Salf et al., "Effects of High Electric Fields on Microorganisms", Biochim. Biophys. Acta, 148 (1967) 781-788.

Hülsheger et al., "Killing of Bacteria with Electric Pulses of High Field Strength", Radiat Environ Biophys (1981) 20:53-65.

\* cited by examiner 100 nm
MV=120.0 KV
30000X

PROCESSES FOR TREATMENT OF RESIDUALS

CROSS-REFERENCE TO RELATED APPLICATIONS

The present application is a continuation of U.S. Ser. No. 16/277,701 filed on Feb. 15, 2019 that is a continuation of U.S. Ser. No. 14/438,123 filed on Apr. 23, 2015 that is a 35 USC 371 national stage entry of PCT/CA2013/000924 filed on Oct. 25, 2013 and which claims priority to U.S. Ser. No. 61/718,386 filed on Oct. 25, 2012. These document are hereby incorporated by reference their entirety.

FIELD OF THE DISCLOSURE

The present disclosure generally relates to improvements in the field of residuals (for example, biosolids, sludge and sediments) treatment. For example, it relates to processes for the treatment of a residual that allow for inactivation of at least one type of pathogen in the residual so as to obtain a treated residual. For example, the treated residual can be suitable for an agricultural purpose.

BACKGROUND OF THE DISCLOSURE

Wastewater treatment plants in Canada produce about 860,000 dry tons per year of sewage residuals (TS); Montréal, Québec generates approx. 270 t TS/day. In Europe, the UK generates 1,640,000 t dry TS/year where 70% is used for land application while in Germany, 20% of its almost 2 billion tons per year of dry solids was applied to land in 2010 (Oleszkiewicz, 2012). Landfilling, incineration and land application are three main options for residuals disposal. As landfilling and incineration each have their own environmental disadvantages, regulators favor agricultural land application of residuals. For example, Section 5.6.8 of the Québec Residual Materials Management Policy 1998-2008 (Québec, 2000) states: "The ultimate goal is to ensure that no sludge is landfilled until it has been demonstrated that recovery is not an economically viable option."

It is estimated that land application of residuals contributes more than $55 M a year to the economy. However, residuals, for example, may contain pathogens from a fecal source which may threaten human health if the residuals are not used safely in accordance with good practice. Therefore, complex regulatory systems, e.g., the Bureau de normalisation du Québec (BNQ) standards, have been developed for reusing residuals with the intention of protecting human, animal and plant health, ground and surface water quality, enduring soil quality and soil biodiversity. These regulations encourage municipal wastewater treatment facilities to treat residuals to a higher quality level and minimize constraints on use; and require relatively expensive management practices, further assuring clean and safe beneficial uses for residuals.

Such treatment should be designed to improve the characteristics of the residuals for a disposal practice, increase the economic feasibility of using a particular practice and reduce the potential for public health, environmental and nuisance problems. Conventional technologies such as time—temperature regimes, high pH—high temperature processes, alkaline treatment by adding lime, beta ray irradiation, gamma ray irradiation and use of a mesophilic anaerobic digester are usually not effective enough, and are usually time-consuming and expensive. Further, other issues and trends including the push for lower greenhouse gas production, reducing dioxins/furans and polychlorinated biphenyls (PCBs), decreasing time and energy requirements, availability of land and acceptability of present practices will affect the selection of a process for residuals treatment.

Electrokinetic treatment is based on the application of, for example, direct current (DC) within a contaminated matrix to remove, for example, pollutants through several electrokinetic phenomena. While it has been used in soil remediation for many years, electrokinetic treatment of residuals is a novel application of such technology in environmental practice.

SUMMARY OF THE DISCLOSURE

According to one aspect, there is provided a process for treating a residual, said process comprising:
  treating a mixture comprising the residual, a peracid or source thereof and an ammonium salt in a reactor, with an electric field, by means of at least one anode and at least one cathode that define therebetween an electrokinetic zone for treating the mixture,
    thereby allowing for inactivation of at least one type of pathogen in the residual so as to obtain a treated residual.

According to another aspect, there is provided a process for treating a residual, said process comprising:
  treating a mixture comprising the residual, a peracid or source thereof and an ammonium salt in a reactor, with an electric field, by means of at least one anode and at least one cathode that define therebetween an electrokinetic zone for treating the mixture,
  thereby allowing for destruction of at least one type of pathogen in the residual so as to obtain a treated residual.

According to another aspect, there is provided a process for treating a residual, said process comprising:
  treating a mixture comprising the residual, a peracid or a source thereof and an ammonium salt, in a reactor, with an electric field, by means of at least one anode and at least one cathode that define therebetween an electrokinetic zone for treating the mixture,
  thereby allowing for simultaneous inactivation and/or destruction of at least one type of pathogen in the residual and dewatering of the residual, so as to obtain a treated dewatered residual and separated water.

It has been shown in the present disclosure that treating a mixture comprising a residual, a peracid or a source thereof and an ammonium salt, for example, ammonium nitrate with, for example, a low voltage gradient in a direct current electric field can simultaneously dewater and inactivate and/or destroy at least one type of pathogen from the residual, producing treated a dewatered residual and separated water. The processes of the present disclosure can, for example, raise the temperature of the mixture, change the chemical properties of the residual, change the physiological properties of *Clostridium perfringens* spores present in the residual, for example, cause the spores to germinate, destroying most pathogens and creating an environment that will not support future pathogen regrowth. The processes of the present disclosure, for example, enhance the ionic strength, cause an exothermic reaction and increase the biocidal stressors/constituents present in the system. The processes of the present disclosure can, for example, provide disinfection, or pasteurization, or sterilization of the residual.

Unlike some prior art processes, the treated residual can, for example, be suitable for agricultural purposes because, for example, the ammonium salt may not create byproducts which can be harmful to human health in such a way that human exposure to them needs to be restricted. The processes of the present disclosure have been shown, for example, to be effective in destroying one of the most resistant forms of a microorganism, *Clostridium perfringens* spores, from anaerobically digested residuals within a fast time of less than two hours. It should be noted that under anaerobic conditions, *C. perfringens* spores are, for example, the most resistant microbe and a three log reduction indicates Class A disinfection with respect to viruses, bacteria and helminth eggs (Blanker et al., 1992). Compared to other methods for producing residuals of a high standard (for example, P1 or Class A biosolids) the processes of the present disclosure are expected to be inexpensive both in initial capital expenditure and ongoing operation and maintenance costs.

Other features and advantages of the present disclosure will become apparent from the following detailed description. It should be understood, however, that the detailed description and the specific examples while indicating embodiments of the present disclosure are given by way of illustration only, since various changes and modifications within the scope of the present disclosure will become apparent to those skilled in the art from this detailed description.

BRIEF DESCRIPTION OF THE DRAWINGS

The following drawings represent examples that are presented in a non-limitative manner:

FIG. 2A is a front view of an electrode for use in a reactor for treating residuals in accordance with an example of the present disclosure, while

DETAILED DESCRIPTION OF THE DISCLOSURE

Figure 1:
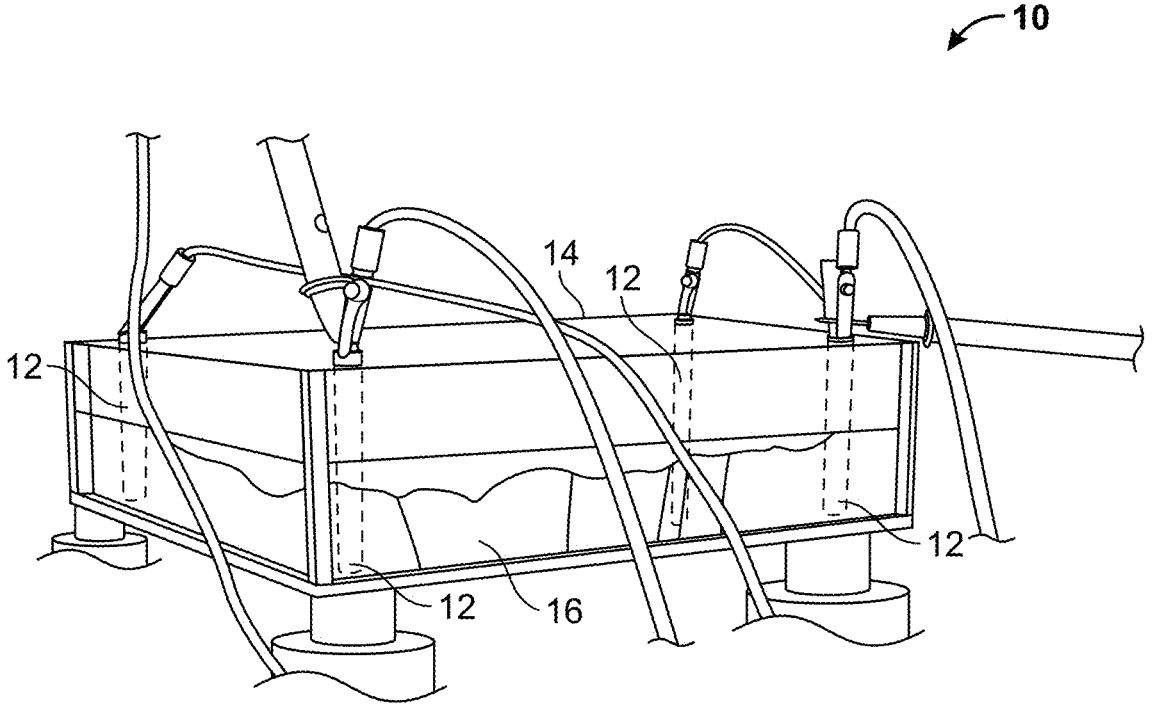
FIG. 1 is a schematic representation of a reactor for treating residuals in accordance with an example of the present disclosure.

Unless otherwise indicated, the definitions and embodiments described in this and other sections are intended to be applicable to all embodiments and aspects of the application herein described for which they are suitable as would be understood by a person skilled in the art.

As used in this application, the singular forms "a", "an" and "the" include plural references unless the content clearly dictates otherwise. For example, an embodiment including "a residual" should be understood to present certain aspects with one type of residual, or two or more additional types of residuals. For example, an embodiment including a "pathogen" should be understood to present certain aspects with one type of pathogen, or two or more additional types of pathogens. For example, an embodiment including "a biosolid" should be understood to present certain aspects with one type of biosolid, or two or more additional types of biosolids.

In embodiments comprising an "additional" or "second" component, such as an additional or second type of residual, or an additional or second type of pathogen, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

The term "residual" as used herein refers, for example, to a solid matter comprising at least one type of organic matter or at least one type of colloid. For example, the residual can be a sludge comprising at least one organic compound or at least one organic matter. For example, the residual can be a biosolid, sewage sludge, an industrial sludge, pulp and paper or mining residuals, a sediment, a deposition, an agricultural sludge, a waste solid or a slurry. For example, the residual can be a medical science residual, a food residual, an agricultural residual, an industrial residual, a mining residual, a mining sludge or slurry. For example, the residual can be human sewage. For example, the residual can be a sediment.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "low voltage gradient" as used herein refers to, for example, an electric field having an intensity gradient of less than about 8 V/cm. The current can be DC or AC current.

The term "AN" as used herein refers to ammonium salts.

The term "BS" as used herein refers to Bioxy S.

The term "LIDEF" as used herein refers to low intensity direct electric field.

The term "DPA" as used herein refers to dipicolinic acid.

The expression "source of peracid" in respect to the expression "peracid or source thereof" and the like as used herein refers, for example, to a composition effective for generating a peracid in situ. The source of peracid can be a solid composition, for example, a composition in powder form. For example, the source of peracid can be a composition comprising a peroxygen source and an acylating agent. The composition can further comprise at least one of an acid, a sequestering agent, a surfactant and a corrosion inhibitor. The choice of a source of peracid is within the capability of one skilled in the art. For example, the composition Bioxy S™ disclosed in Canadian Patent Application No. 2,569,025 can be used as a source of peracid.

The term "peroxygen source" as used herein refers, for example, to a compound or composition effective for generating active oxygen species, for example, hydrogen peroxide, in situ. For example, the peroxygen source can be chosen from a percarbonate, a perborate and a persulfate. For example, the peroxygen source can be a percarbonate. For example, the percarbonate can be sodium carbonate peroxyhydrate. The choice of a peroxygen source is within the capability of one skilled in the art.

The term "acylating agent" as used herein refers, for example, to a compound which acts as a source of the corresponding peracylate anion and/or a source of the corresponding peracid upon reaction in situ with the peroxygen source. For example, the acylating agent can be an acetylating agent. For example, the acetylating agent can be tetraacetyl ethylene diamine (TAED), which can act as a source of peracetate anion and/or peracetic acid upon reaction in situ with a peroxygen source, for example, sodium carbonate peroxyhydrate. The choice of an acylating agent is within the capability of one skilled in the art.

The expression "inactivation of at least one type of pathogen in the residual" as used herein refers, for example, to an inactivation and/or destruction of the pathogen in the residual, for example, an anaerobically digested sewage sludge to at least about a Class A disinfection level. For example, in the case of *Clostridium perfringens* spores, the expression "inactivation of at least one type of pathogen in the residual" as used herein refers, for example, to an inactivation and/or destruction, in the residual of at least about a 3 log reduction of *Clostridium perfringens* spores. It should be noted that under anaerobic digestion, the *C. perfringens* spore is a considerably resistant microbe, and a three log reduction indicates Class A disinfection with respect to viruses, bacteria and helminth eggs (Blanker et al., 1992). An about a three log reduction means about a 99.9% reduction.

The term "disinfection" or "disinfecting" and the expression "to disinfect" as used herein refers, for example, to the inactivation of at least 3 log of the at least one type of pathogen.

The term "pasteurization" as used herein refers, for example, to inactivation by about 4 to about 5 log of the at least one type of pathogen exposed, for example, for a period of at least 30 min to the processes of the present disclosure.

The expression "high level of disinfection" or the expression "to disinfect" as used herein refers, for example, to destroy pathogens by at least 5 log, for example where a majority of the members of the at least one type of pathogen are killed.

The term "sterilization" or the expression "to sterilize" as used herein means, for example, to inactivate or destroy the at least one type of pathogen at more than about 8 log, where, for example, almost all of the members of the at least one type of pathogen are killed.

The expression "near sterilizing" or "near sterilization" as used herein means, for example, to inactivate or destroy the at least one type of pathogen at about 7 to about 8 log, where, for example, almost all of the members of the at least one type of pathogen are killed.

The term "inactivating" or "inactivation" or the expression "to inactivate" as used herein refers, for example, to render the at least one type of pathogen unable to grow/replicate.

The term "destroy" or "destruction" as used herein refers, for example, to kill the at least one type of pathogen.

The expression "electrokinetic zone" as used herein refers to, for example, a zone disposed between electrodes, wherein electrokinetic phenomena have been generated by applying an electrical current between a plurality of electrodes, for example, four electrodes, so that at least one electrode functions as an anode and at least one electrode functions as a cathode.

The expression "adequate inactivation conditions in the reactor are maintained" as used herein refers to, for example, maintaining the conditions in the reactor so that they will allow for inactivation and/or destruction of at least one type of pathogen in the residual. For example, parameters such as the time, pH, temperature, initial concentration of solids, and initial concentration of pathogens may be varied. The choice of conditions so that they will allow for inactivation and/or destruction of at least one type of pathogen in the residual (for example, so that pasteurization is reached) or inactivation and/or destruction of a majority of viable pathogens, ova and spores (for example, so that sterilization is reached) is within the capability of a person skilled in the art, particularly with reference to the present disclosure.

For example, the voltage gradient of the electric field can be a low voltage gradient.

For example, the electric field can be a direct current electric field or an alternating current electric field.

For example, the voltage gradient of the direct current electric field can be less than about 8 V/cm.

For example, the processes of the present disclosure can further comprise simultaneous dewatering of the residual so as to obtain a treated dewatered residual and separated water.

For example, the mixture comprising the residual, the peracid or source thereof and the ammonium salt can be prepared by adding the peracid or source thereof and ammonium salt to the residual. For example, the mixture comprising the residual, the peracid or source thereof and the ammonium salt can be prepared outside of the reactor, then dispersed into the reactor prior to commencing treating the mixture.

For example, the ratio of the peracid or source thereof to the ammonium salt can be less than about 5 g/g. For example, the ratio of the peracid or source thereof to the ammonium salt can be about 0.1 g/g to about 5 g/g. For example, the ratio of the peracid or source thereof to the ammonium salt can be about 0.5 g/g to about 5 g/g. For example, the ratio of the peracid or source thereof to the ammonium salt can be about 1 g/g to about 5 g/g. For example, the ratio of the peracid or source thereof to the ammonium salt can be about 2 g/g to about 5 g/g.

For example, the ratio of the peracid or source thereof and the ammonium salt to the residual can be less than about 40 g/L. For example, the ratio of the peracid or source thereof and the ammonium salt to the residual can be from about 7 g/L to about 26 g/L.

For example, in the processes of the present disclosure, adequate inactivation conditions in the reactor can be maintained.

For example, the mixture can be treated for a time of less than about 4 hours. For example, the mixture can be treated for a time of about 0.5 hours to about 3 hours. For example, the mixture can be treated for a time of less than about 0.5 hours. For example, the mixture can be treated for a time of less than about 3 hours.

For example, the mixture can be treated at a temperature of below about 70° C. For example, the mixture can be treated at a temperature of about 70° C. to about 95° C. For example, the mixture can be treated at a temperature of above about 95° C. For example, the mixture can be treated until it reaches a temperature of about 99° C. For example, the mixture can be treated until it reaches a temperature of about 97° C.

For example, the mixture can be treated at a pH above about 9. For example, the mixture can be treated at a pH above about 10.

For example, the reactor can have two electrodes. For example, the reactor can have four electrodes. For example, the reactor can have more than four electrodes.

For example, the electrodes can be cylindrical. For example, the electrodes can be flat.

For example, the at least one anode and at least one cathode can comprise a conductive material. For example, the conductive material can comprise stainless steel or iron. For example, the conductive material can be stainless steel. For example, the stainless steel can be perforated stainless steel. For example, the perforated stainless steel can be stainless steel 316L. For example, the conductive material can be coated with a coating chosen from stainless steel mesh, carbon mesh or a textile. For example, the coating can be stainless steel mesh. For example, the stainless steel mesh can have a mesh size of about 200 μm.

For example, the at least one anode and at least one cathode can be cylindrical. For example, the at least one anode and at least one cathode can be flat.

For example, the at least one type of pathogen can be a virus, a bacteria, a spore, an ova, or mixtures thereof.

For example, the at least one type of pathogen can be *Salmonella, Ascaris* eggs, *C. perfringens, E. coli*, or mixtures thereof.

For example, the at least one type of pathogen can be *Clostridium perfringens*. For example, the *Clostridium perfringens* can be in the form of spores.

For example, the processes of the present disclosure can carry out disinfection, for example, the processes can inactivate and/or destroy the vegetative pathogens, for example, a reduction of FC by 3 log out of a total of $10^6$ or a reduction of fecal streptococci by 90% can be achieved.

For example, the processes of the present application can achieve less than 1 PFU *Enterovirus* per 4 g of dry solids, and less than 100 MPN fecal streptococci in 1 g of dry solids. For example, in the processes of the present disclosure, less than 3 helminthes ova per 10 g of dry solids and a log 4 reduction of *C. perfringens* spore can also be achieved.

For example, in the processes of the present disclosure, a log 5 reduction of *Clostridium perfringens* spores can be achieved, and less than 1 viable helminth ova in 1 kg of dry solids can be observed, as well as both *Salmonella* and fecal coliform can be substantially absent in 25 g of dry solids.

For example, in the processes of the present disclosure, a log 8 reduction of *Clostridium perfringens* spores can be reached.

For example, the processes of the present disclosure can be effective for destroying the cell structure of spores.

For example, the processes of the present disclosure can be effective for destroying viruses (e.g. up to a log 11 reduction).

For example, the processes of the present disclosure can be effective for destroying *E. coli* (e.g. up to a $10^6$ reduction).

For example, the processes of the present disclosure can be effective for destroying *Salmonella* (e.g. up to a $10^4$ reduction).

For example, the reactor can have one or more outlets for removal of the separated water.

For example, the reactor can have a vessel installed underneath each of the at least one anode and at least one cathode for collecting electroosmotic flow. For example, the vessel can comprise a bottle, a pipe or a reservoir.

For example, the peracid or source thereof can be a source of peracid. For example, the source of peracid can be a composition comprising a peroxygen source and an acylating agent. For example, the peroxygen source can be chosen from a percarbonate, a perborate and a persulfate. For example, the peroxygen source can be a percarbonate. For example, the percarbonate can be sodium carbonate peroxyhydrate. For example, the acylating agent can be an acetylating agent. For example, the acetylating agent can be tetraacetyl ethylene diamine.

For example, the composition comprising a peroxygen source and an acylating agent can further comprise an acid. For example, the acid can be chosen from an organic acid, sulfamic acid, phosphoric acid, sulfuric acid and hydrochloric acid. For example, the organic acid can be chosen from acetic acid, citric acid and formic acid. For example, the organic acid can be citric acid.

For example, the composition comprising a peroxygen source and an acylating agent can further comprise a sequestering agent. For example, the sequestering agent can be chosen from ethylenediaminetetraacetic acid, nitriloacetic acid or a phosphonic acid based sequestering agent.

For example, the composition comprising a peroxygen source and an acylating agent can further comprise a surfactant. For example, the composition comprising a peroxygen source and an acylating agent can further comprise a corrosion inhibitor.

For example, the composition comprising a peroxygen source and an acylating agent can be a solid composition. For example, the composition comprising a peroxygen source and an acylating agent can be in a powder form.

For example, the peracid or source thereof can be a peracid. For example, the peracid can be peracetic acid.

For example, the ammonium salt can be chosen from ammonium acetate, ammonium bromide, ammonium carbamate, ammonium carbonate, ammonium chloride, ammonium fluoride, ammonium formate, ammonium hydrogenoxalate, ammonium hydrogensulfate, ammonium iodide, ammonium nitrate, ammonium oxalate, ammonium sulfate and mixtures thereof. For example, the ammonium salt can be ammonium nitrate.

For example, the processes of the present disclosure can be effective for disinfecting the residual. For example, the processes of the present disclosure can be effective for pasteurizing the residual. For example, the processes of the present disclosure can be effective for sterilizing the residual.

For example, the processes of the present disclosure can be effective for inactivating at least 4 log of the at least one type of pathogen. For example, the processes of the present disclosure can be effective for inactivating at least 5 log of the at least one type of pathogen. For example, the processes of the present disclosure can be effective for inactivating at least 6 log of the at least one type of pathogen. For example, the processes of the present disclosure can be effective for inactivating at least 7 log of the at least one type of pathogen. For example, the processes of the present application can be effective for inactivating the at least one type of pathogen by at least 8 log.

For example, the processes of the present disclosure can be effective for carrying out a destruction of at least 4 log of the at least one type of pathogen. For example, the processes of the present disclosure can be effective for carrying out a destruction of at least 5 log of the at least one type of pathogen. For example, the processes of the present disclosure can be effective for carrying out a destruction of at least 6 log of the at least one type of pathogen. For example, the processes of the present disclosure can be effective for carrying out a destruction of at least 7 log of the at least one type of pathogen. For example, the processes of the present application can be effective for carrying out a destruction of the at least one type of pathogen by at least 8 log.

For example, the treated residual can be suitable for use in an agricultural purpose.

For example, the residual can be a treated or untreated sewage sludge, a treated or untreated industrial sludge or a treated or untreated agricultural sludge. For example, the residual can be a sewage sludge.

The processes of the present disclosure are, for example a pasteurization or disinfection or sterilization technology which has shown promising results for upgrading residuals to high quality standards. By controlling, for example, the electrochemical processes, which can generate temperature with time (up to about 70° C., from about 70° C. to about 95° C. and above about 95° C.) leading to a log reduction of pathogens of about 3, about 5 and about 9 respectively. It is expected to provide, for example, an inexpensive and reliable means of producing a readily usable and valuable high standard P1 (Class A) product and by EU regulations, an acceptable residual material. The most eminent characteristics of the processes of the present disclosure can be described as follows:

First, the application of a low voltage gradient electric field (for example, less than about 8 V/cm) enhanced with a peracid or a source thereof, for example, Bioxy S (BS) and an ammonium salt (AN) provides the benefit of low energy consumption. Furthermore, the applied enhancement agents (EAs), for example, BS and AN do not create disinfection byproducts (DBPs) which would be harmful to human health in such a way that human exposure to them needs to be restricted. BS is a biocide and strong oxidant which is rapidly converted to carbonic acid and sodium carbonate. It is used for disinfection of equipment in the food industry. Ammonium components can be found in fertilizers and have very little effect on pH level in the soil. In the residual matrix, the ammonium salt, increases the electrical conductivity of the residual, increasing the efficiency of the treatment system. The ammonium salt can also liberate ammonia, which acts as a biocide.

Second, it has been shown that the processes of the present disclosure have the ability, for example to eradicate one of the most resistant forms of microorganism, *Clostridium perfringens* spores, in anaerobically digested residuals (for example, biosolids) within two hours. Hence, the processes of the present disclosure can be effective on resistant microorganisms, and are a fast treatment technology to achieve safe residuals which can be widely used and handled without restriction. Conventional methods such as composting, thermal drying, digestion technologies and lime stabilization either are not effective on spores or need a minimum treatment time of at least 72 hours.

Further, the processes of the present disclosure can, for example raise the temperature of the material to above about 97° C., effectively killing most pathogens and creating an environment that will not support future pathogen regrowth.

Simultaneous dewatering of the residual is another advantage of the processes of the present disclosure. The treated residual may not, for example require a further dewatering process. The separated water can, for example be reused directly in irrigation.

Compared to other methods of producing Class A biosolids and residuals acceptable by EU regulations, the processes of the present disclosure are expected to be inexpensive in both initial capital expenditure and ongoing operation and maintenance costs. The equipment can be fully automated and requires very little operator time.

The following non-limiting example is illustrative of the present application:

Example 1

The BioElectro™ processes of the present disclosure are an innovative application of low voltage gradient in, for example, direct electric field technology to treat a residual. It is a technology that combines at least two functions in one: dewatering and pathogen destruction as per BNQ-P1 regulatory compliance (USEPA requirements for class A) as well as regulations in all European Union countries and quality improvement which permits more unrestricted, beneficial uses of residuals. It requires a low energy source in the form of, for example, direct current (DC), and offers a suitable technology for a low-tech solution to sludge management applicable to all regions around the world.

Figure 2A:
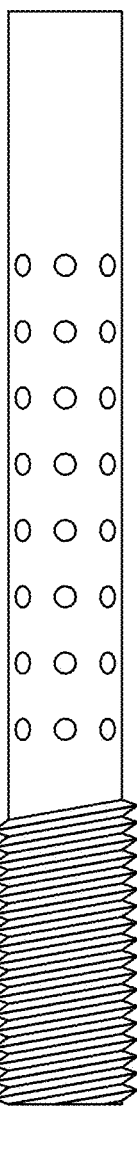
Figure 2B:
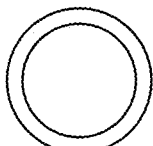
FIG. 2B is a top view of the same electrode.

The processes of the present disclosure can be based on the application of a low voltage gradient in, for example, a direct electric field with two enhancing agents (EAs): Bioxy S (BS) and an ammonium salt, for example, ammonium nitrate (AN). The concentration of BS and AN used increases the conductivity of the sewage sludge. Further, the disinfection role of BS and AN, at the applied concentrations, without application of the electrical field would be negligible. The process was conducted in laboratory size prototype BioElectro™ equipment consisting of a regulated power supply and a 3,100 mL rectangular BioElectro™ reactor (FIG. 1) with internal dimensions of 214 mm length× 214 mm width×74.1 mm height. The reactor 10 comprises four electrodes 12 and a rectangular housing 14 that is effective for receiving the residual 16. The electrodes 12 can comprise 2 cathodes and 2 anodes. The electrodes can be flat, circular, perforated or not and they can have various configurations. The electrodes can also be concentric. The power supply transforms alternating current (AC) from a utility line (120-V, 60 Hz) into high voltage AC, then rectifies to DC signals. The BioElectro™ reactor can be equipped with four perforated stainless steel (316L) electrodes (cylinders 10 mm in diameter, 102 mm long) coated with mesh (200 μm), for example, stainless steel mesh, located at a distance of 172 mm from each other in proximity of outlet (see FIGS. 2A and 2B). Underneath each electrode, a 200 mL bottle was installed to collect electroosmotic flow (EOF) during the experiment.

A considerable effort has been made to identify indicator microorganisms whose presence would suggest that human pathogens might be present in the residual. *C. perfringens* is a spore-forming thermophilic bacterium and its spore has been suggested as an indicator for inactivation mechanisms other than temperature as it is resistant to temperature. This organism is found in densities of about $10^6$ colony forming units (CFUs) per gram of solids in raw biosolids (Reimers (2002)).

The process starts by adding BS and AN to the sewage sludge (the ratio of BS to AN can be about 0.5 to about 2 g/g or can be about 0.1 to about 2 g/g). The prepared suspension is then dispersed into BioElectro™ reactors with a working volume of 2,800 mL. Electrokinetic (EK) phenomena are generated by applying an electrical current between the electrodes such that at least one of the electrodes functions as an anode and at least one of the electrodes functions as a cathode. A flow of water is induced from the sludge towards the outlets due to the applied electric field. Accordingly, the sludge is dewatered. The dewatering process eliminates water, raises the concentration of solids and reduces sludge volume, thus reducing the costs of further treatment and handling. Simultaneously, the destruction of *Clostridium perfringens* spores is achieved after two hours treatment of the sewage sludge. The effective near sterilization conditions (>8 log reduction of spores) are obtained at constant voltage gradients of less than about 5 V/cm in the presence of BS and AN.

The studies of the present disclosure showed that voltage gradient, BS and AN are not sufficiently effective when used alone. In other words, spore inactivation and/or destruction could be obtained only through the interactive disinfection of voltage gradient and the enhancement agents BS and AN.

Figure 3:
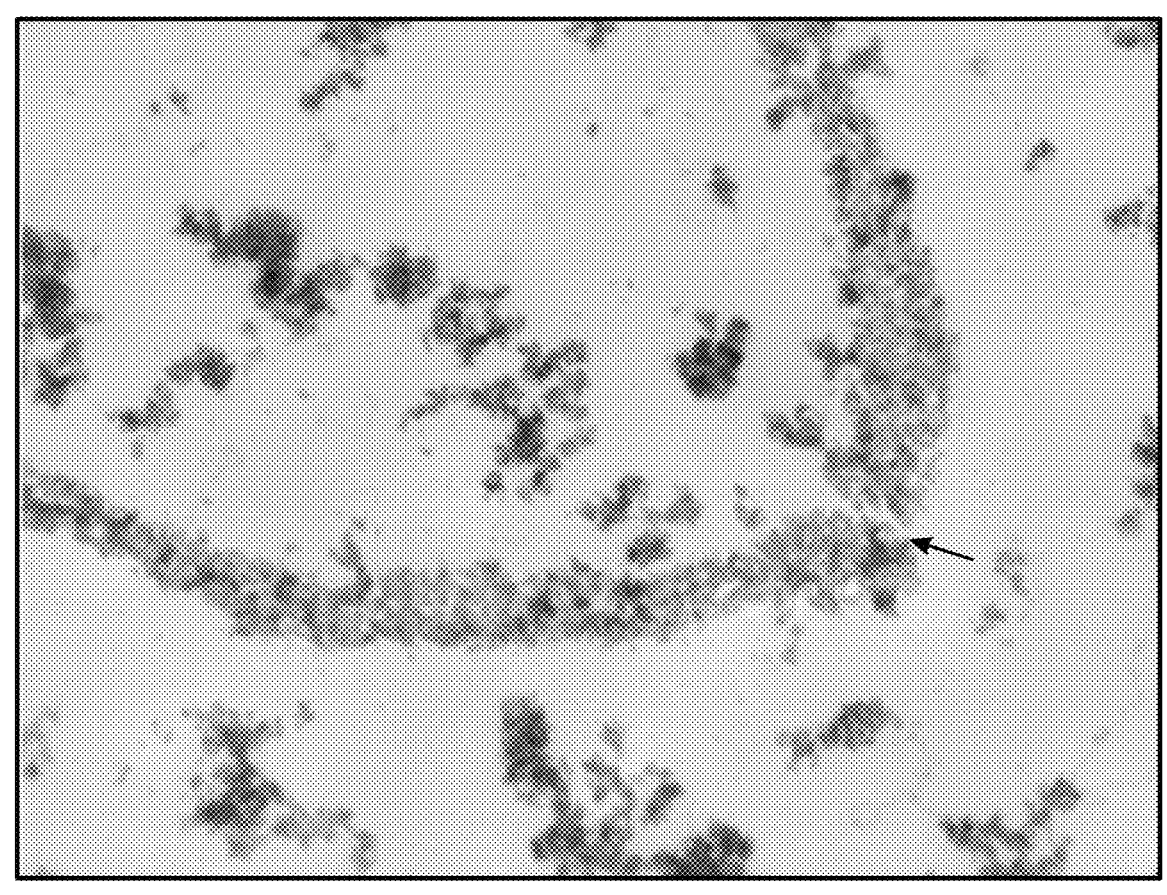
FIG. 3 is an exemplary transmission electron microscope (TEM) micrograph showing the creation of nicks in *Clostridium perfringens* spore membranes (black arrow) after treatment by a process of the present disclosure.

Without wishing to be bound to such a theory, the mechanism of disinfection suggests that different factors which attack numerous spore constituents, including spore coats, proteins, unsaturated lipids, respiratory enzymes and peptidoglycans are involved in the inactivation and/or destruction of *C. perfringens* spores in the processes of the present disclosure. For example, reactions taking place due to the EK phenomena help to create effective oxidative zones, which neutralize protective systems inside and outside of *C. perfringens* spores. The generated oxygen-based free radicals diffuse to targets within the spore protoplast, possibly in the core membrane, and impair the spores. Without wishing to be bound to such a theory, the mechanism of spore inactivation and/or destruction under the influence of an electric field may include: (1) significant alteration in spore shape and surface properties such as hydrophobicity and net surface charge; and (2) change in the configuration of membrane components such as lipids. All of these impacts can potentially lead to irreversible permeabilization of the membrane, resulting in leakage of crucial cytoplasmic components. The breakdown of spore membranes and creation of nicks under the studied conditions was observed in treated spores (FIG. 3).

Figure 4:
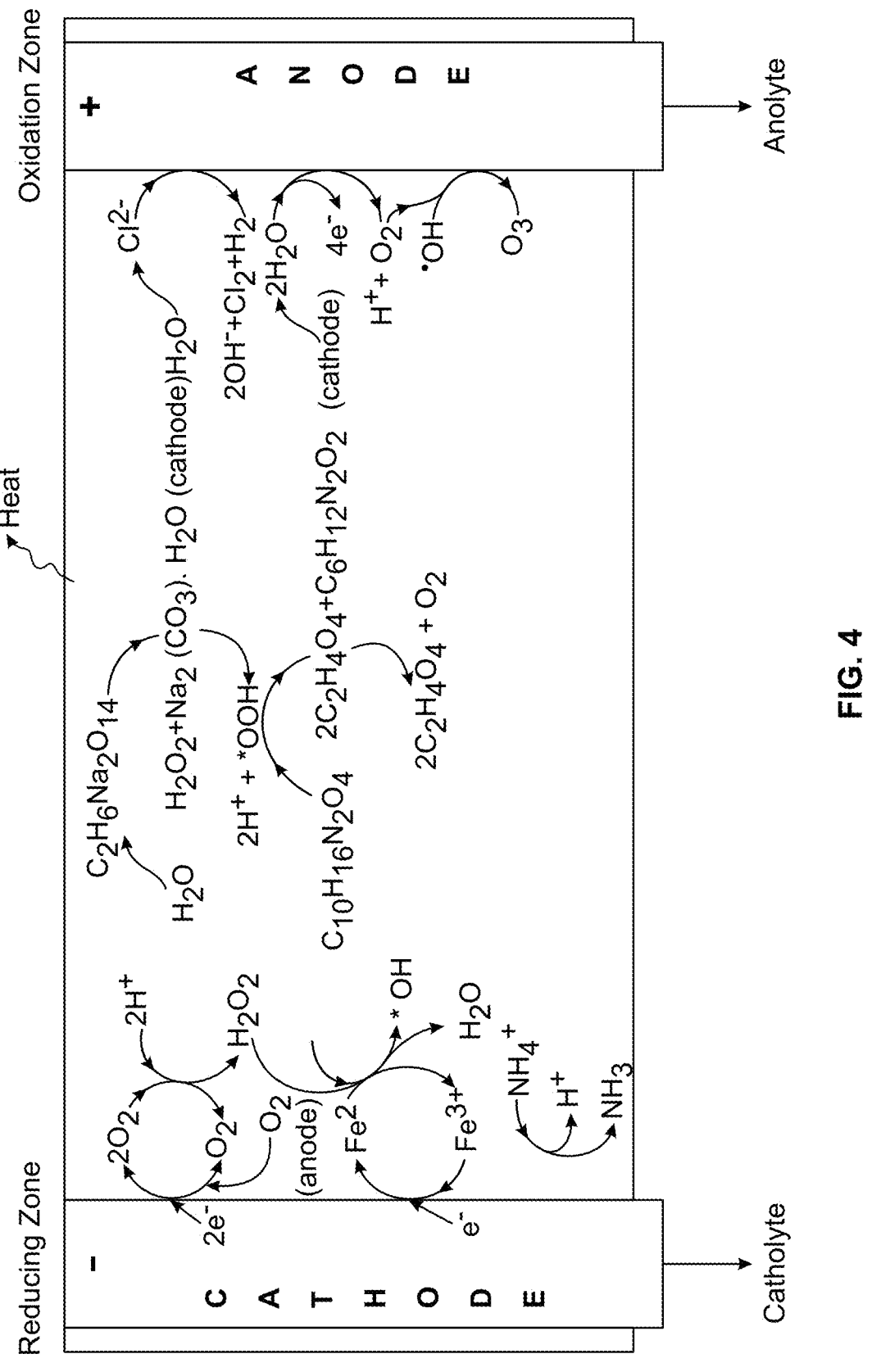
FIG. 4 is a schematic representation of the treatment reactions according to a process of the present disclosure.

Along with the action of the electric field on the spores, electrochemical redox reactions (FIG. 4) which occur simultaneously on the electrode surfaces, facilitate the production of toxic hydrogen peroxide and chlorine or subsequent hypochlorous acid, both of which may infiltrate into the inner part of the spores and hasten the inactivation and/or destruction process. Induced electrochemical reactions also bring about large pH changes in the localized vicinity of the electrodes. Therefore, the pH of the sewage sludge increased significantly, to a level that ruptures disulfide bonds in the spore coats and leads to hydrolysis of cortex. Moreover, at the elevated pH (>10.7), AN has a higher spore inactivation and/or destruction power. This is attributed to the generation of ammonia in the molecular form ($NH_3$) rather than the ionized form ($NH_4^+$).

Without wishing to be bound to such a theory, the direct current also helps germination of spores and lowers their

Figure 5:
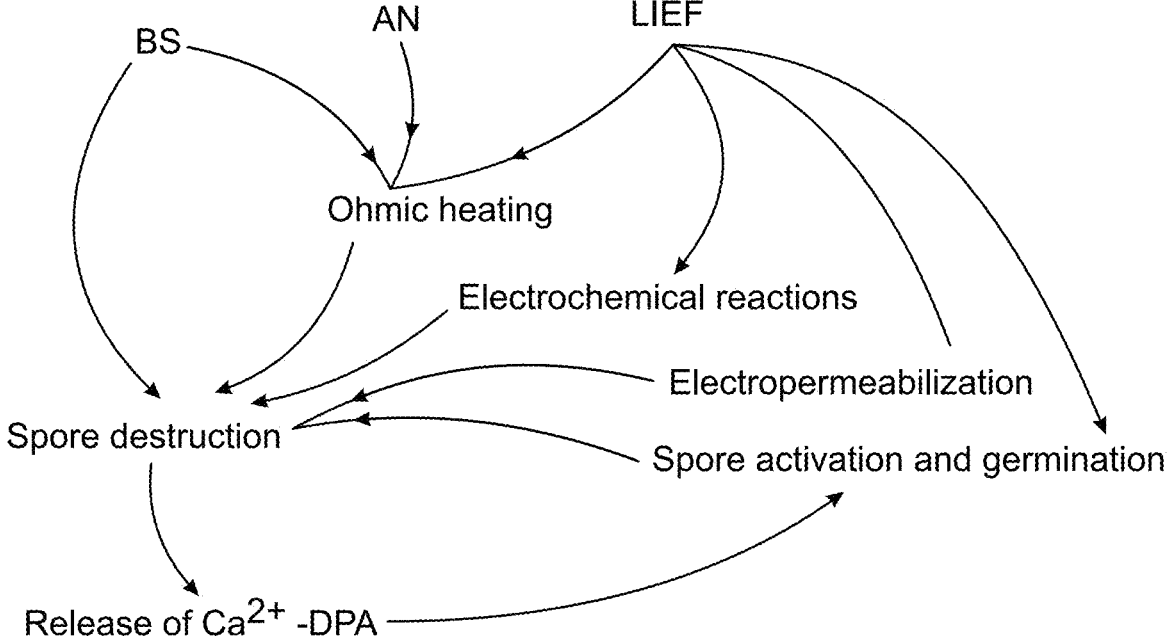
FIG. 5 is a schematic representation of the lethal pathways in a *C. perfringens* spore according to a process of the present disclosure.
Figure 6:
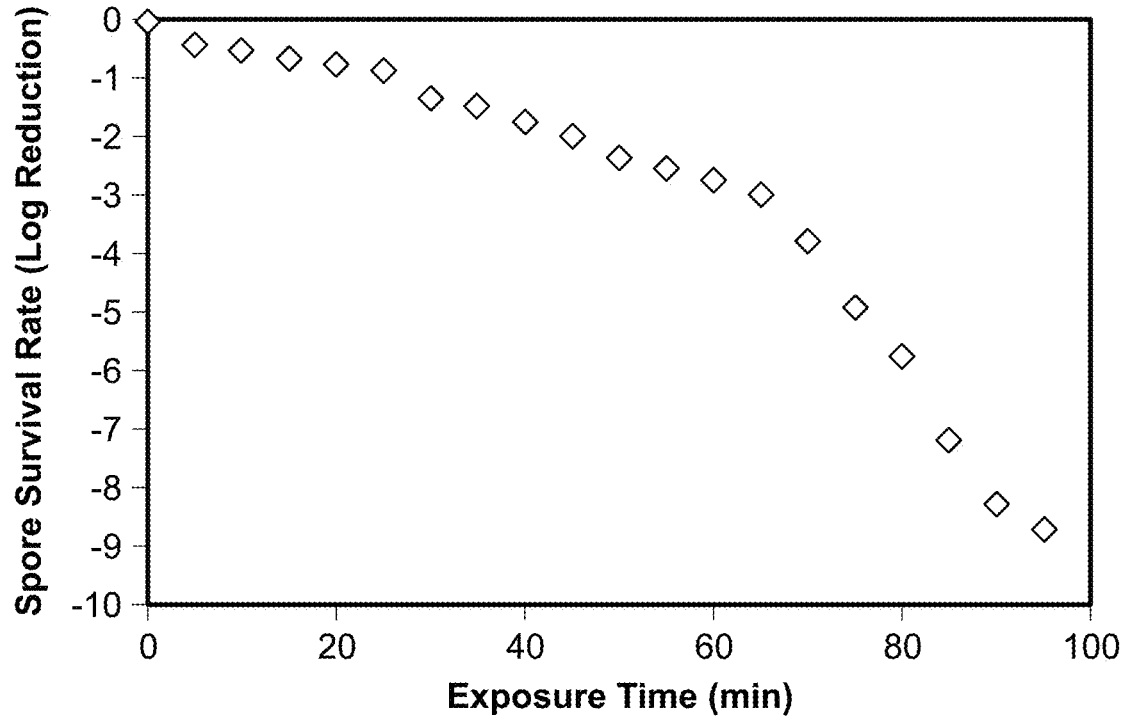
FIG. 6 is an exemplary plot showing the log reduction of *Clostridium perfringens* spores over time in anaerobically digested residuals treated with a process of the present disclosure.

12 resistance to harsh conditions due to: (1) sub-lethal heat (above about 62° C. for example at about 62 to about 95° C.) generated during the treatment which begets alterations in the permeability of the spore coats and opening of a chemical bond between dipicolinic acid (DPA) and spore enzymes; and (2) an electrokinetically deployed reduction state at the cathodic side of the BioElectro™ reactor ruptures disulfide bonds in the spore coats and brings about hydrolysis of cortex. Moreover, ohmic heating produced during the process brings about degradation of the spore cortex, and makes the membrane dysfunctionally permeabilized, causing cell death. FIG. 5 shows the lethal pathways in the processes of the present disclosure. FIG. 6 is an exemplary plot showing the log reduction of *Clostridium perfringens* spores over time in an anaerobically digested residual treated with a process of the present disclosure.

The person skilled in the art would understand that the various properties or features presented in a given embodiment can be added and/or used, when applicable, to any other embodiment covered by the general scope of the present disclosure.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

REFERENCES

Blanker, E. M., Little, M. D., Reimers, R. S., and Akers, T. G., "Evaluating the Use of *Clostridium Perfringens* Spores as Indicator of the Presence of Viable *Ascaris* eggs in Chemically Treated Municipal Sludges," Proceedings of Municipal Sludge (Biosolids) Management—Where We Are and Where We're Going (Volume I), Water Environmental Specialty Conference Series, Alexandria, VA, pp. 187-201 (July, 1992).

Elektorowicz, M.; Safaei, E.; Oleszkiewicz, J. and Reimers, R. Electrokinetic remediation of biosolids through inactivation of *Clostridium perfringens* spores. $6^{th}$ Symposium on Electrokinetic Remediation (EREM), 2007.

Oleszkiewicz J. A. (2012) Sludge management in the European Union: directives and practice, CSCE/PZITS, $10^{th}$ Int. Conference on Water Supply and Quality, Stare Jablonki, Poland.

Reimers, R. S.; Oleszkiewicz, J. A.; Bowman, D. D and Faulmann, E. L. (2002) PEC application for the national classification of the J-ap process to the category of PFRP, Report for Paradigm International, Inc. Louisiana, USA.

Safaei Takhtehfouladi, E., Inactivation of *Clostridium perfringens* spore in anaerobically digested biosolids during BioElectro™ process, PhD thesis, Concordia University, Montreal, QC, Canada, 2007.

Safaei Takhtehfouladi, E. Enhanced electrokinetic (EK) technology: A comparative study for inactivation of *Clostridium perfringens* spores and reovirus in anaerobically digested biosolids. Master's thesis, Concordia University, Montreal, QC, Canada, 2007.

Safaei, E. and Elektorowicz M. Bench-scale trial of electrokinetic treatment on anaerobically digested biosolids: Microbial inactivation, 8th World Congress of Chemical Engineering; Canada, 2009.

The invention claimed is:

1. A process for treating a residual, said process comprising:

treating a mixture comprising the residual, a peracid or a source thereof and an ammonium salt, in a reactor, with an electric field at a voltage gradient of less than about 8 V/cm, by means of at least one anode and at least one cathode that define therebetween an electrokinetic zone for treating the mixture, thereby generating a temperature in the electrokinetic zone of about 62° C. to about 95° C., thereby allowing for inactivation of at least one spore in the residual by at least a log 5 reduction, so as to obtain a treated residual, wherein the ratio of the concentration of peracid or source thereof to the concentration of ammonium salt is about 0.1 to about 0.5, and wherein the peracid or source thereof is peracetic acid or a source of peracetic acid, and wherein the mixture is treated for a time of less than about 4 hours.

2. The process of claim 1, wherein the ammonium salt is a chloride or nitrate.

3. The process of claim 1, wherein the mixture is treated at a temperature of below about 70° C.

4. The process of claim 1, wherein the mixture is treated at a temperature of about 62° C. to about 70° C.

5. The process of claim 1, wherein the voltage gradient of the electric field is less than about 5 V/cm.

6. The process of claim 1, wherein the electric field is a direct current electric field.

7. The process of claim 1, further comprising simultaneous dewatering of the residual so as to obtain a treated dewatered residual and separated water.

8. The process of claim 1, wherein the ratio of the concentration of peracid or source thereof to the concentration of ammonium salt is about 0.2 to about 0.5.

9. The process of claim 1, wherein the mixture is treated for a time of about 0.5 hours to about 3 hours.

10. The process of claim 1, wherein the mixture is treated for a time of less than about 0.5 hours.

11. The process of claim 1, wherein the mixture is treated for a time of less than about 3 hours.

12. The process of claim 1, wherein the mixture is treated at a temperature of above about 70° C.

13. The process of claim 1, wherein the mixture is treated at a temperature of about 70° C. to about 95° C.

14. The process of claim 1, wherein the mixture is treated at a pH above about 9.

15. The process of claim 1, configured to cause germination of the at least one spore, leading to weakening of membranes of the at least one spore making it permeable.

16. The process of claim 15, wherein the treating generates ammonia gas in the electrokinetic zone which penetrate the membranes of the at least one spore affecting DNA of the at least one spore.

* * * * *